(12) United States Patent
Malik et al.

(10) Patent No.: US 7,451,187 B2
(45) Date of Patent: Nov. 11, 2008

(54) VIEWING ATTACHMENTS TO ELECTRONIC COMMUNICATIONS VIA PUSHING THE ATTACHMENT TO A NETWORKED VIEWING SITE

(75) Inventors: Dale W. Malik, Dunwoody, GA (US); Robert A. Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 22 days.

(21) Appl. No.: 10/994,448

(22) Filed: Nov. 22, 2004

(65) Prior Publication Data

US 2005/0086315 A1   Apr. 21, 2005

Related U.S. Application Data

(63) Continuation-in-part of application No. 09/563,929, filed on May 4, 2000, now Pat. No. 6,907,452.

(51) Int. Cl.
*G06F 15/16* (2006.01)
*G06F 12/00* (2006.01)

(52) U.S. Cl. .................................. 709/206; 709/207

(58) Field of Classification Search ................. 709/206, 709/207, 250
See application file for complete search history.

(56) References Cited

U.S. PATENT DOCUMENTS

| | | | | |
|---|---|---|---|---|
| 5,771,355 A * | 6/1998 | Kuzma | ....................... | 709/232 |
| 5,790,674 A * | 8/1998 | Houvener et al. | ............ | 713/185 |
| 5,903,723 A * | 5/1999 | Beck et al. | ................... | 709/200 |
| 5,940,823 A * | 8/1999 | Schreiber et al. | ............... | 707/3 |
| 6,092,114 A * | 7/2000 | Shaffer et al. | ............... | 709/232 |
| 6,219,694 B1 * | 4/2001 | Lazaridis et al. | ............ | 709/206 |
| 6,256,666 B1 | 7/2001 | Singhal | | |
| 6,304,898 B1 | 10/2001 | Shiigi | | |
| 6,625,642 B1 | 9/2003 | Naylor et al. | | |
| 6,721,784 B1 | 4/2004 | Leonard et al. | | |
| 6,732,101 B1 * | 5/2004 | Cook | .......................... | 707/10 |
| 6,785,867 B2 | 8/2004 | Shaffer et al. | | |
| 6,823,368 B1 * | 11/2004 | Ullmann et al. | ............. | 709/206 |
| 6,839,411 B1 * | 1/2005 | Saltanov et al. | .......... | 379/88.13 |
| 6,907,452 B1 | 6/2005 | Malik | | |
| 7,107,315 B1 * | 9/2006 | Rodriguez et al. | .......... | 709/206 |

(Continued)

FOREIGN PATENT DOCUMENTS

WO   WO 02/42860 A2 * 5/2002

OTHER PUBLICATIONS

Malik; U.S. Appl. No. 11/140,447, filed May 27, 2005.

(Continued)

*Primary Examiner*—Zarni Maung
(74) *Attorney, Agent, or Firm*—Thomas, Kayden, Horstemeyer & Risley, LLP.

(57) ABSTRACT

A method and system for viewing an attachment to an electronic communication transmitted in an electronic messaging system is disclosed in which the system receives a communication; examines the content of the communication; sends an attachment contained in the communication to an alternate viewing site; and presents the content of the attachment contained in the communication at the alternate viewing site in a universally-viewable format. An alternative embodiment further includes prompting the receiver of the communication for verification of a previously assigned personal identification number.

20 Claims, 12 Drawing Sheets

U.S. PATENT DOCUMENTS

| | | | | |
|---|---|---|---|---|
| 2001/0044829 | A1* | 11/2001 | Lundberg | 709/206 |
| 2002/0035576 | A1* | 3/2002 | Kishimoto et al. | 707/200 |
| 2003/0004916 | A1* | 1/2003 | Lewis | 707/1 |
| 2003/0120496 | A1* | 6/2003 | Alfred et al. | 705/1 |
| 2003/0163531 | A1* | 8/2003 | Nakajima | 709/206 |
| 2003/0187938 | A1* | 10/2003 | Mousseau et al. | 709/206 |
| 2004/0148221 | A1* | 7/2004 | Chu | 705/14 |
| 2004/0266441 | A1* | 12/2004 | Sinha et al. | 455/445 |
| 2005/0086310 | A1* | 4/2005 | Kamdar et al. | 709/206 |

OTHER PUBLICATIONS

Malik; U.S. Appl. No. 09/563,929, filed May 4, 2000.

Malik; Non-Final Rejection mailed Nov. 10, 2003 for U.S. Appl. No. 09/563,929, filed May 4, 2000.

Malik; Final Rejection mailed Jun. 1, 2004 for U.S. Appl. No. 09/563,929, filed May 4, 2000.

Malik; Examiner Interview Summary Record mailed Nov. 19, 2004 for U.S. Appl. No. 09/563,929, filed May 4, 2000.

Malik; Notice of Allowance and Fees Due mailed Nov. 19, 2004 for U.S. Appl. No. 09/563,929, filed May 4, 2000.

Fulton; "Easy Microsoft Outlook 97", J. Que, Copyright 1997, pp. 50-51 and 70-77.

Mulvenna; "Using Simeon E-mail on PC Caledonia", Heriot-Watt University, Aug. 1998, pp. 1-12.

Thomas; "Digital Toolbox", IEEE Internet Computing, May-Jun. 1997, pp. 97-99.

* cited by examiner

VIEWING ATTACHMENTS TO ELECTRONIC COMMUNICATIONS VIA PUSHING THE ATTACHMENT TO A NETWORKED VIEWING SITE

CROSS-REFERENCE TO RELATED APPLICATIONS

This application is a continuation-in-part of U.S. application Ser. No. 09/563,929, entitled "Method and Apparatus for Attaching Viewer Applets to Electronic Mail Communications," filed May 4, 2000 now U.S. Pat. No. 6,907,452, incorporated herein by reference.

NOTICE OF COPYRIGHT PROTECTION

A portion of the disclosure of this patent document and its figures may contain material subject to copyright protection. The copyright owner has no objection to the facsimile reproduction by anyone of the patent document or the patent disclosure, but otherwise reserves all copyrights whatsoever.

BACKGROUND OF THE INVENTION

The present invention relates to the transmission of electronic communications over communication networks, and more particularly, to viewing attachments to electronic communications.

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world. Most e-mail application programs allow a user to attach a file to be sent along with a message as an attachment. Attachment files might include word processing documents, graphics files, audio or video, multimedia presentation files, computer-aided drawing ("CAD") files, mathematical equation editor files, spreadsheet reports, etc. A recipient will receive the e-mail message plus any attached files, which may then be opened if the recipient's computer has the appropriate application software. In many applications, it is preferable to send documents through e-mail attachments instead of a facsimile because the recipient can then print an exact replica of the original file. For long-distance communications, it is also less costly to send documents via e-mail as compared with a facsimile.

Although many currently available e-mail application programs enable a user to send attachments as part of an e-mail communication, there are problems that recipients often encounter when receiving e-mail attachment files. If a recipient's computer does not have the particular user application software that corresponds with the attachment file, the recipient will not be able to access the attachment. For example, if a sender attaches a CAD document created with CAD software for transmission in an e-mail communication, the recipient might not be able to access or view the file unless the recipient has installed the same CAD software as in the sender's computer. Considering the number of different software vendors that supply software for word processing, graphing, drawing, video editing, CAD, etc., it can be quite common for a recipient to be unable to open an attached document in an e-mail communication. Even if the recipient's computer system supports a particular vendor's software, the recipient might still not be able to access or view the file if the transmitted document was created on a more recent version of this software. In order to view the document, the recipient must then request the sender to save the attachment file in a different format that is compatible with the recipient's software and re-transmit the e-mail communication.

Some e-mail application programs include "quick viewer" features for the recipient of an e-mail attachment file to view the file. These e-mail application programs store viewer applets for many of the popular software packages that are commonly used. The viewer applets are executable files that allow the recipient to view, but not open or edit, a file that was received, when a user selects the received file. While the "quick viewer" feature may allow the recipient to view the majority of transmitted files, there may still be file types that are not supported by the viewer. Particularly, the "quick viewer" may not support specialty software that does not have widespread use. Even with widely-used software packages, the documents composed with the newest version of the software may not be accessible by the "quick viewer" when new versions or upgrades of a software vendor are released. Because of the number of different software packages that are commonly available, it would be impractical to install an upgrade of the e-mail application program each time a commonly-used software package is upgraded. These problems significantly reduce the benefits of e-mail systems and may negatively affect both the sender's and recipient's productivity when engaging in electronic mail communications.

BRIEF SUMMARY OF THE INVENTION

In view of the difficulties encountered with viewing attachments to electronic communications described above, there is a need for a method and system to detect an attachment that cannot be viewed using the software capabilities of the device on which the electronic communication was received and offer an alternate means by which the recipient can view the attachment easily. Further, there is a need for such a method and system that does not require new software or capabilities on the recipient's electronic communications device. According to exemplary embodiments, the present invention provides a method for viewing the content of an attachment to an electronic communication that would not otherwise be viewable by the recipient. An electronic communication is received. A deficiency in the receiving device's capability to present an attachment to the communication in a viewable manner is detected. The attachment is sent to an alternate viewing site, such as a website, and the site is visited by the recipient to view the attachment.

According to exemplary embodiments, the present invention also provides an interactive prompting of the recipient to offer the service of sending the attachment to an alternate site for viewing. If the recipient accepts the offer, the recipient is further prompted to enter a security code via an input device such as a computer keyboard. This security code is sent along with the attachment file to the alternate viewing site and is used by the recipient as a private key by which to gain entry to view their file.

Once the file has been viewed, it may optionally be downloaded by the recipient in its converted and viewable format. Additionally, it may be deleted from the alternate viewing site after a specified number of viewings, after a specified time duration, or after it is downloaded by the recipient.

According to exemplary embodiments, the present invention further provides a system for performing the conversion of a received attachment at the alternate viewer from one file format to another more commonly-used file format. This conversion is initiated when the recipient visits the alternate viewing site (e.g., via an HTML hyperlink) and clicks on an icon that represents the original attachment.

DETAILED DESCRIPTION OF THE INVENTION

Figure 1:
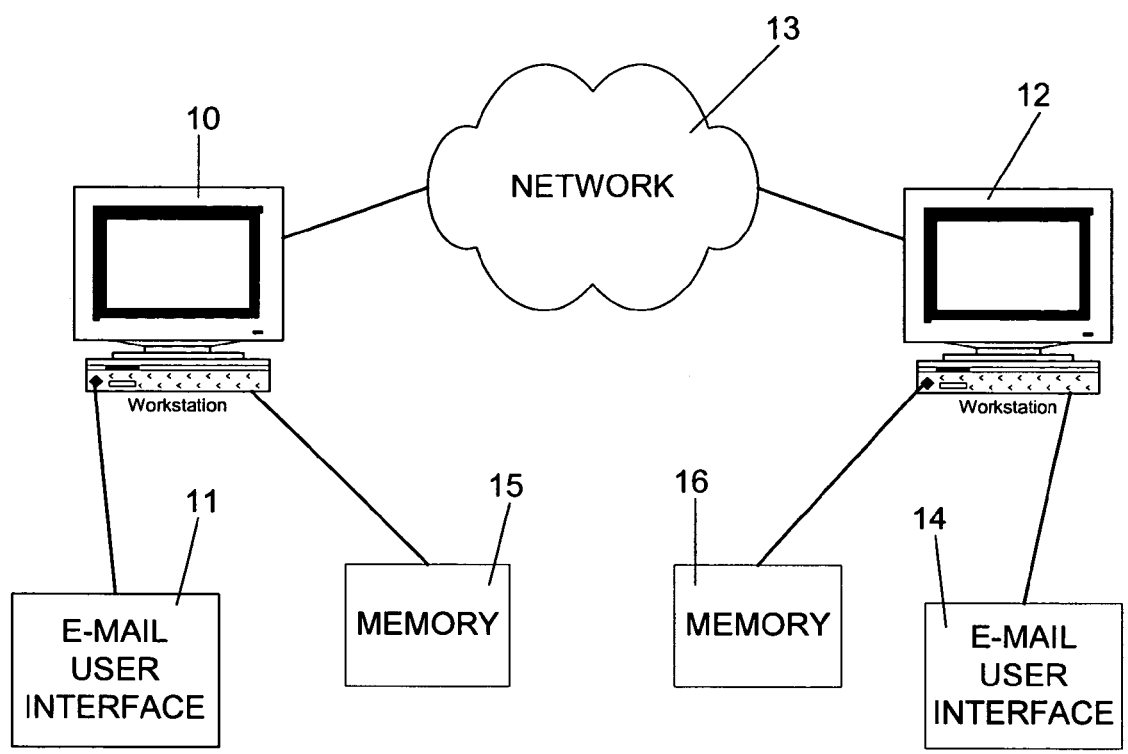
FIG. 1 is a schematic diagram of a basic computer network system according to an exemplary embodiment of the present invention.

The present invention will now be described in more detail with reference to the figures. FIG. 1 is a schematic diagram of a basic computer network system, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LANs or WANs, the world wide web, or any combination thereof. Computers 10 and 12 may be the only computers connected to the network 13, or the network may be shared by many other computers. Computers 10 and 12 additionally include memories 15 and 16, respectively, for storing a plurality of user applications, which may or may not include software packages for word processing, CAD, mathematical equation editing, video editing, graphics, multimedia presentations, etc.

Figure 2:
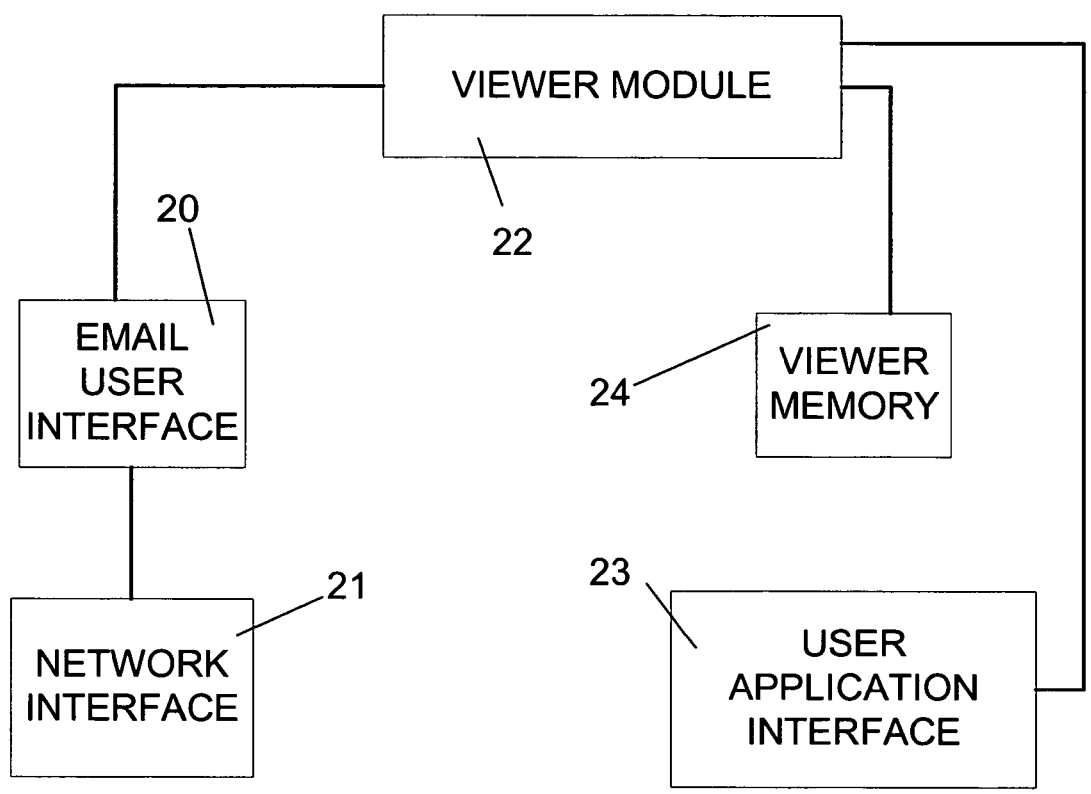
FIG. 2 is a schematic diagram of an e-mail communications system according to an exemplary embodiment the present invention.

The present invention is directed to a system and method for selectively attaching viewer applets to e-mail communications when it is likely that the recipient of the e-mail communication will not be able to open or view an attachment file that is to be sent in the e-mail. As shown in FIG. 2, an e-mail communications system according to the present invention includes an e-mail user interface 20 by which a user composes e-mail communications. A network interface 21 is connected to the user interface for transmitting and receiving e-mail communications, and for transmitting or receiving viewer applets used for viewing attachment files. E-mail user interface 20 is also connected to viewer module 22. As will be explained below, viewer module 22 controls the placement and transmission of viewer applets in outgoing e-mail communications, and enables a user to view attachment files in incoming e-mail communications. Viewer module 22 is connected to the user application interface 23 to receive viewer applets from other user application software packages that are installed on the user's computer system. Viewer memory 24 stores viewers for commonly-used user applications.

Figure 3:
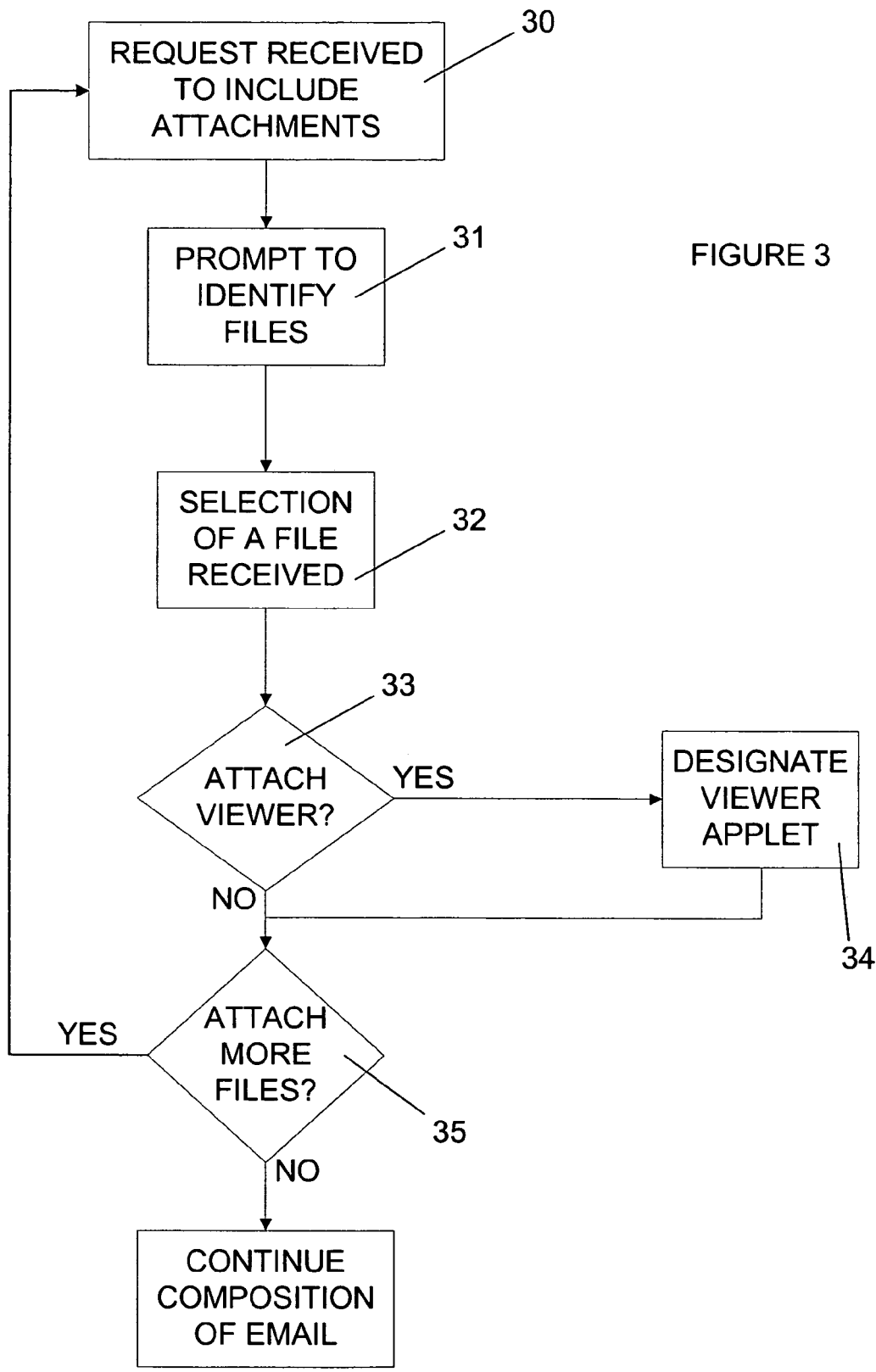
FIG. 3 is a flow diagram for attaching viewer applets to an e-mail communication according to a first embodiment of the present invention.

In a first embodiment of the present invention, the viewer module 22 of FIG. 2 attaches a viewer applet corresponding to an attachment file during the assembly of an e-mail communication. The flow diagram in FIG. 3 is an example of the steps that could be used to implement this embodiment. When a user elects to include an attachment with an e-mail communication, a signal is sent to the viewer module, as shown in step 30. A menu prompt is provided in step 31 to select one or more files to attach to the e-mail communication. The menu prompt of step 31 is generated in the user-interface 20 shown in FIG. 2. It allows the user to access file information maintained in a document management system in either the e-mail communications system itself, the computer's operating system, or on the network to which the user's computer is attached.

Once a file is selected to be an attachment in step 32, the viewer module 22 determines whether to add the viewer applet that corresponds with the attachment file, in step 33. The viewer module can be configured for several possible modes of operation. In one mode of operation, viewer module 22 always adds the corresponding viewer applet to the e-mail communication. The principal advantage of this mode is that it provides the highest degree of certainty that any recipient should be able to view attachments from the sender, although on many occasions the recipient would otherwise be able to view these files. In a second mode of operation, the sender is prompted to elect whether to include a viewer applet corresponding to the selected attachment. This mode allows the sender to avoid unnecessarily sending the viewer applet when the sender knows that the recipient's computer is capable of displaying the file.

In a third mode of operation, the viewer module prompts the sender to include a viewer applet only when it is likely that the recipient does not have the corresponding viewer applet or application software. This can be performed by referring to a list of file types stored in the viewer memory 24, and only prompting the sender to send a viewer applet when the selected attachment file type is not among those in the list. Another method is to generate the prompt when the sender's own e-mail communication system would not be able to view the attachment. That is, a prompt is generated when the viewer software stored in viewer memory 24 does not include a component for viewing the attached file.

If the sender elects to include a viewer applet, the viewer applet is added to the e-mail communication for transmission to the recipient, in step 34. The viewer applet may be copied from the application software package by which the attachment file was created, through application interface 23 in FIG. 2. It is also possible that the sender's computer has third party viewer software, from which a component corresponding to the relevant application software is then extracted and attached to the e-mail.

This process is repeated until the sender indicates that there are no more attachment files to be selected, in step 35. The sender can then continue to compose the e-mail communication in the normal course.

In a second embodiment, the viewer module is incorporated into a system that allows the user to configure groups of application files attached to an e-mail communication as packages. In this system, the user can designate a file to be a part of a new or an existing package of application files from within the user application software. The packages of application files, as defined by the user, can then be included as an e-mail attachment in a future e-mail communication. At the time when the user designates a file to be an attachment, the viewer module determines whether to include a viewer applet in the e-mail communication by the same modes of operation disclosed with respect to FIG. 3.

Figure 4:
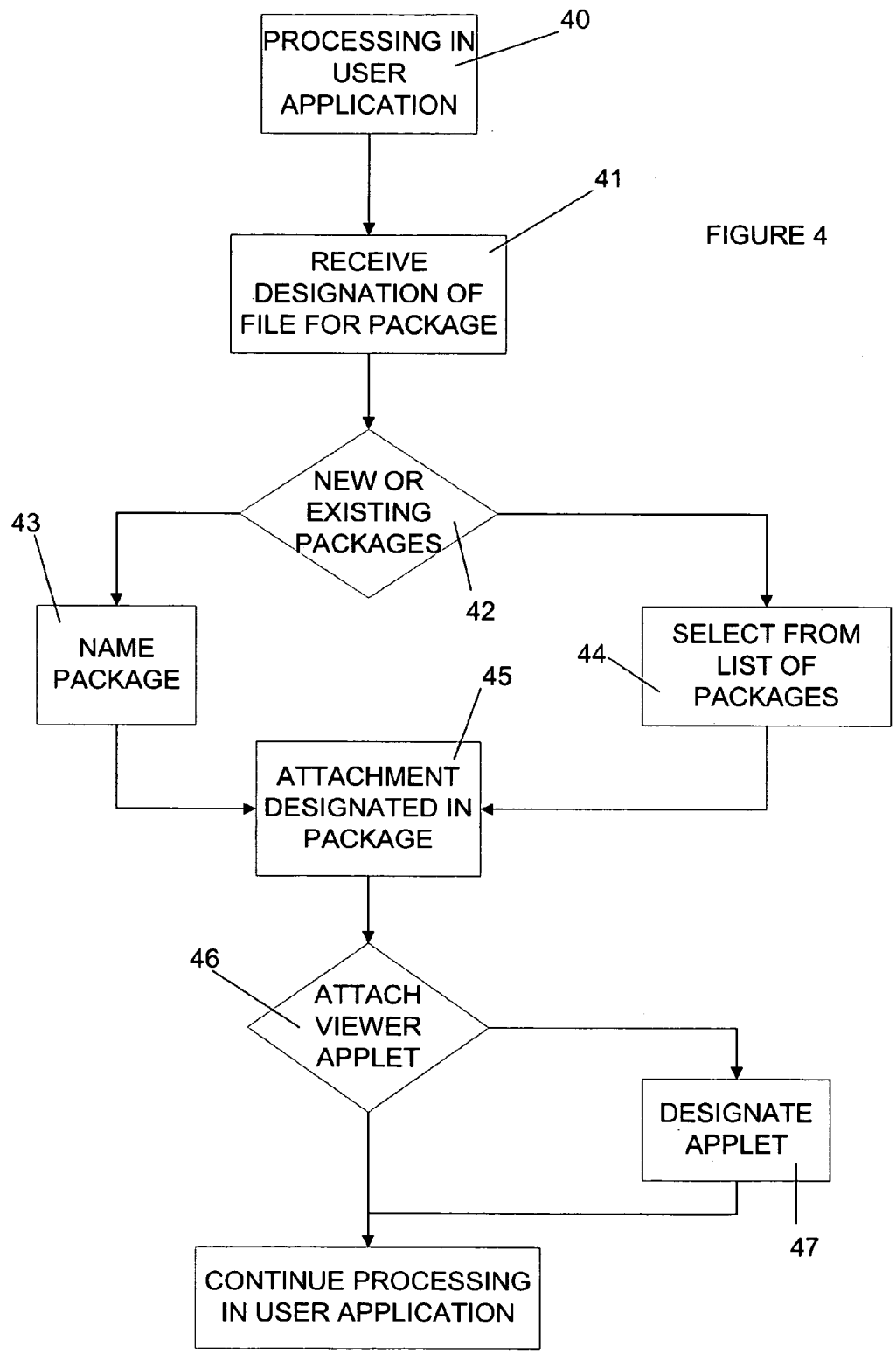
FIG. 4 is a flow diagram for configuring packages of attachment files with corresponding viewer applets according to a second embodiment of the present invention

FIG. 4 provides a flow diagram illustrating how the e-mail application interfaces with a user application to coordinate the composition of packages of designated files for attachments and the attachment of viewer applets. A user opens a user application, as in step 40, and begins to process an application file in the normal course. In this context, processing may include creating a new file, or opening and editing an existing file. The application files may be in a text format or any graphics, audio/video, or multimedia-type format. Graphics files might include jpeg, tif, or gif files. At any time during processing of the file, the user may choose to designate the application file for a package, as in step 41. This may be done by selecting an icon that is overlaid onto the screen of the user application. Alternatively, the user application itself may incorporate a macro within its menu or in its "toolbar" for creating e-mail attachment packages.

The user is then prompted to select an appropriate package for the designated file, in step 42. As one option, the user may choose to create a new package. If so, the system prompts the user to identify a package name, in step 43. Optionally, the system may create an icon that is to be associated with the package. If the user wishes to add the attachment file to an existing package, the system prompts the user to select from a list of packages, by name or by icon, or to provide the desired package name, in step 44. In step 45, the user application file is now designated as an attachment for a particularly defined package.

When an application file is designated as an attachment, the viewer module 22 in FIG. 2 determines whether to add the viewer applet that corresponds with the attachment file, as in step 33 of FIG. 3. The step of determining whether to attach a viewer applet in step 46 of FIG. 4 can be automatic, user-selected, or a combination of the two, as explained above. If a viewer applet is to be included into the e-mail communication, the applet is designated as another attachment for the defined package in step 47.

Figure 5A:
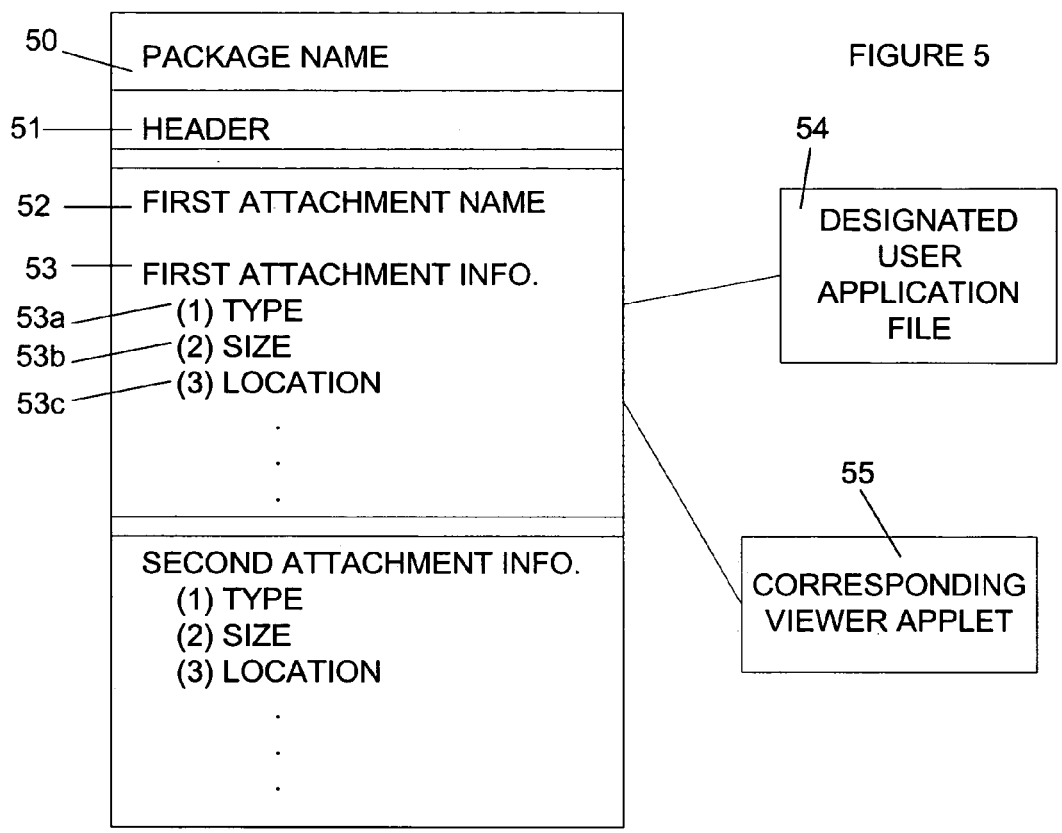
FIG. 5a is a schematic of a data structure representation of a package of attachment files according to the second embodiment of the present invention.
Figure 5B:
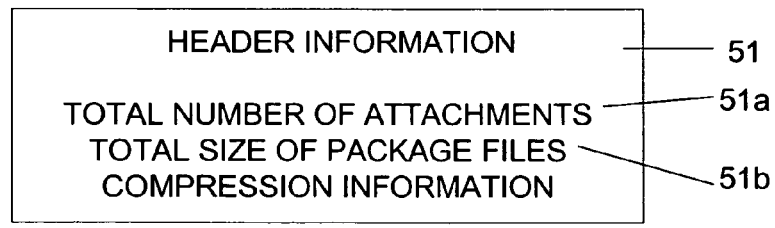
FIG. 5b is a schematic of a data structure representation of a header information field in FIG. 5a according to the second embodiment of the present invention.

When an application file is designated as an attachment, a pointer or link is then associated between the application file and a data structure for the package, as illustrated with reference to FIGS. 5a, and 5b. As shown in FIG. 5a, the data structure contains the package name 50 defined to identify the package. As shown in FIG. 5b, the header information 51 stores information about the package itself, which may include the number of attachment files currently associated with the package 51a, the total size of the combination of attachment files 51b, and information regarding the capabilities for compressing the file. For each file designated as an attachment and associated with the package, the data structure includes the user-defined attachment name 52, and general attachment file information 53, including the file type 53a, file size 53b, file location 53c, etc. A pointer or link from the attachment information 53 to the user application file 54 is maintained. If the corresponding viewer applet is to be included, another pointer or link to the viewer applet 55 is maintained.

Figure 6:
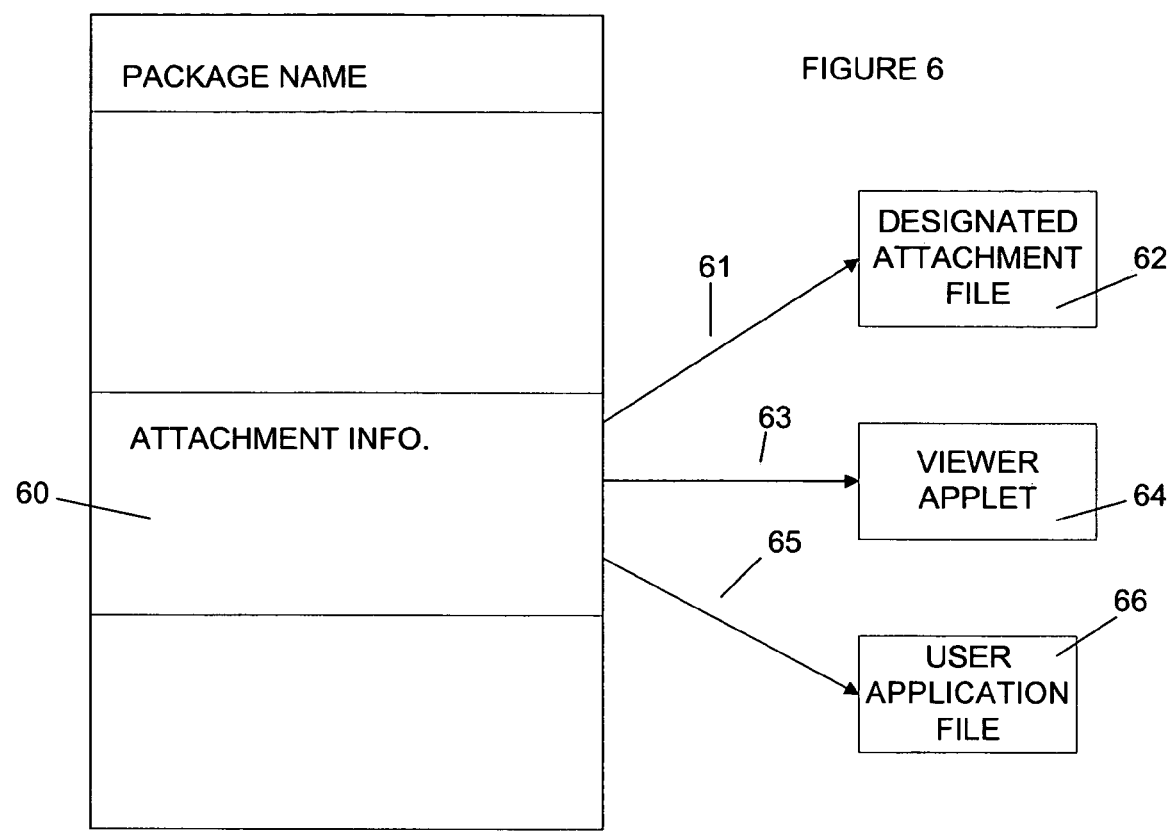
FIG. 6 is a schematic of a data structure representation of a package of attachment files according to the second embodiment of the present invention.

In an alternative embodiment, a copy of the user application file is made and stored as a separate file. In this data structure, shown in FIG. 6, the attachment information portion 60 maintains a link or pointer 61 to a new copy of the user application file, stored as designated attachment 62, and another link or pointer 63 to a copy of the corresponding viewer applet 64. In this embodiment, when a user application file is designated as an attachment, a copy is made of the user application file in its current form. Any subsequent edits to the user application after the user designates the file in a package are not automatically incorporated into the attachment file. However, because the user may desire to transmit the latest version of the user application, a second pointer is also maintained 65 to the user application file 66. When the user enters the e-mail application and requests to include a particular package as an attachment, the system can detect whether the user application file 66 has changed from the designated attachment 62, and the user can choose which file to include in the package. Although it is more cumbersome to store a separate copy of the user application file to be attached, this embodiment provides additional functionality for the user.

As a third embodiment, the present invention further includes an attachment delayed-delivery module that temporarily suspends delivery of the viewer applet attachment at the sender's e-mail post office, or server, until the viewer is requested by the recipient. If the viewer applet attachment is not requested within a predetermined or user-selected time limit, e.g., one week, the viewer applet is deleted from the sender's post office. The attachment delayed-delivery module allows a recipient's e-mail communications system to automatically request transmission of the viewer applet over the network when necessary to view an attachment in an e-mail communication. When the viewer applet is not necessary for the recipient, the attachment delayed-delivery module reduces unnecessary traffic over the network.

Figure 7:
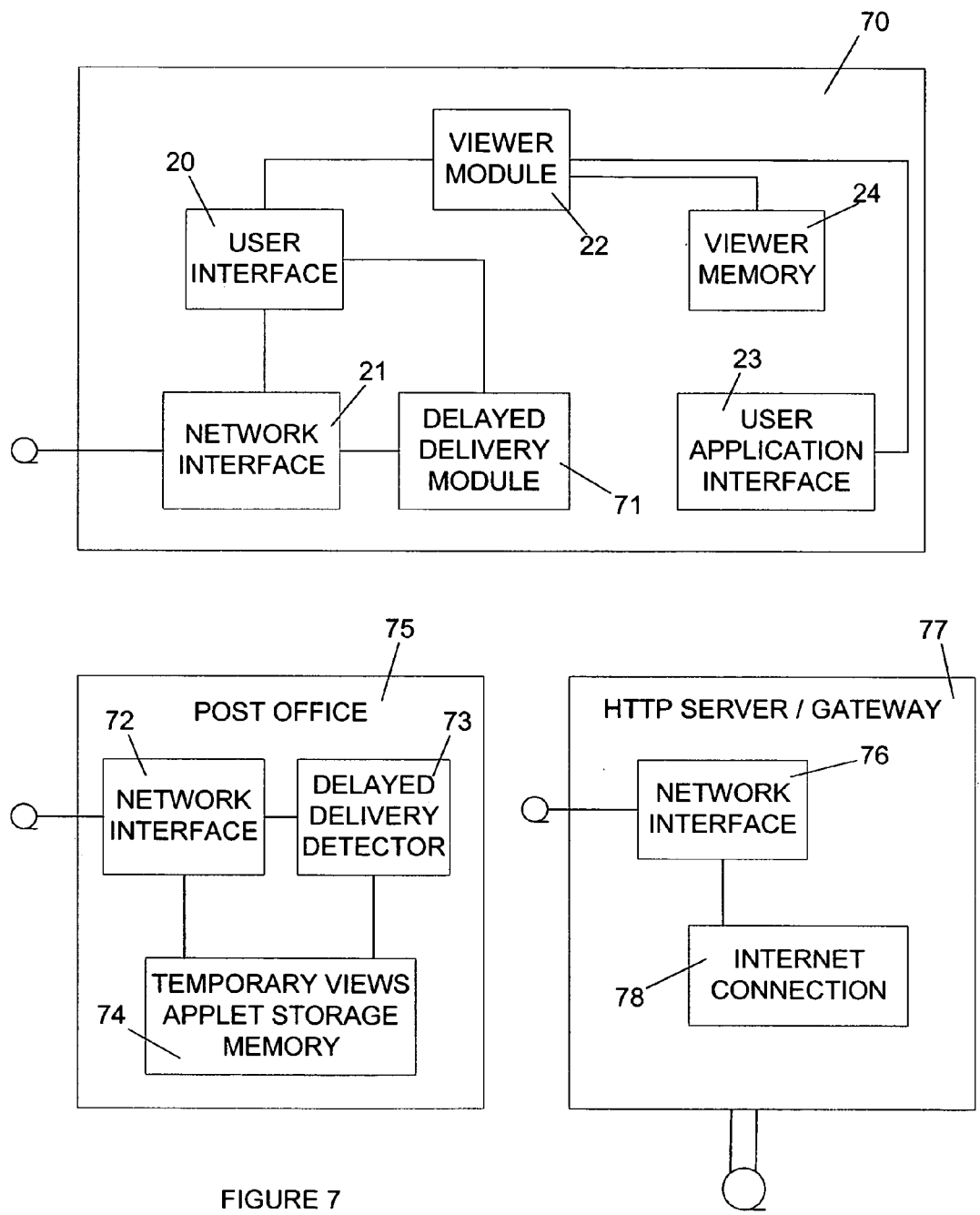
FIG. 7 is a schematic of an e-mail communications system with a delayed delivery module according to a third embodiment of the present invention.

The configuration of an e-mail communications system incorporating an attachment delayed-delivery module is explained with reference to FIG. 7. The e-mail communications system 70 includes the user interface 20, network interface 21, viewer module 22, viewer memory 24, and user application interface 23, as shown in FIG. 2 above. The system 70 also includes a delayed delivery module 71, connected to the user interface 20 and the network interface 21, in order to send viewer applet attachments in separate e-mails that are transmitted to the recipient only upon request by the recipient.

Through network interface 21, delayed delivery module 71 transmits attachments of viewer applets to post office 75. This is received by network interface 72, detected by delayed delivery detector 73, and temporarily stored in temporary memory 74. If the destination address provided with the e-mail communication is for an e-mail external to the network, to be transmitted via the internet, the original e-mail communication including the attachment is forwarded from the post office 75 to the http server/gateway 77, through network interface 76, and on to the internet connection 78.

Figure 8:
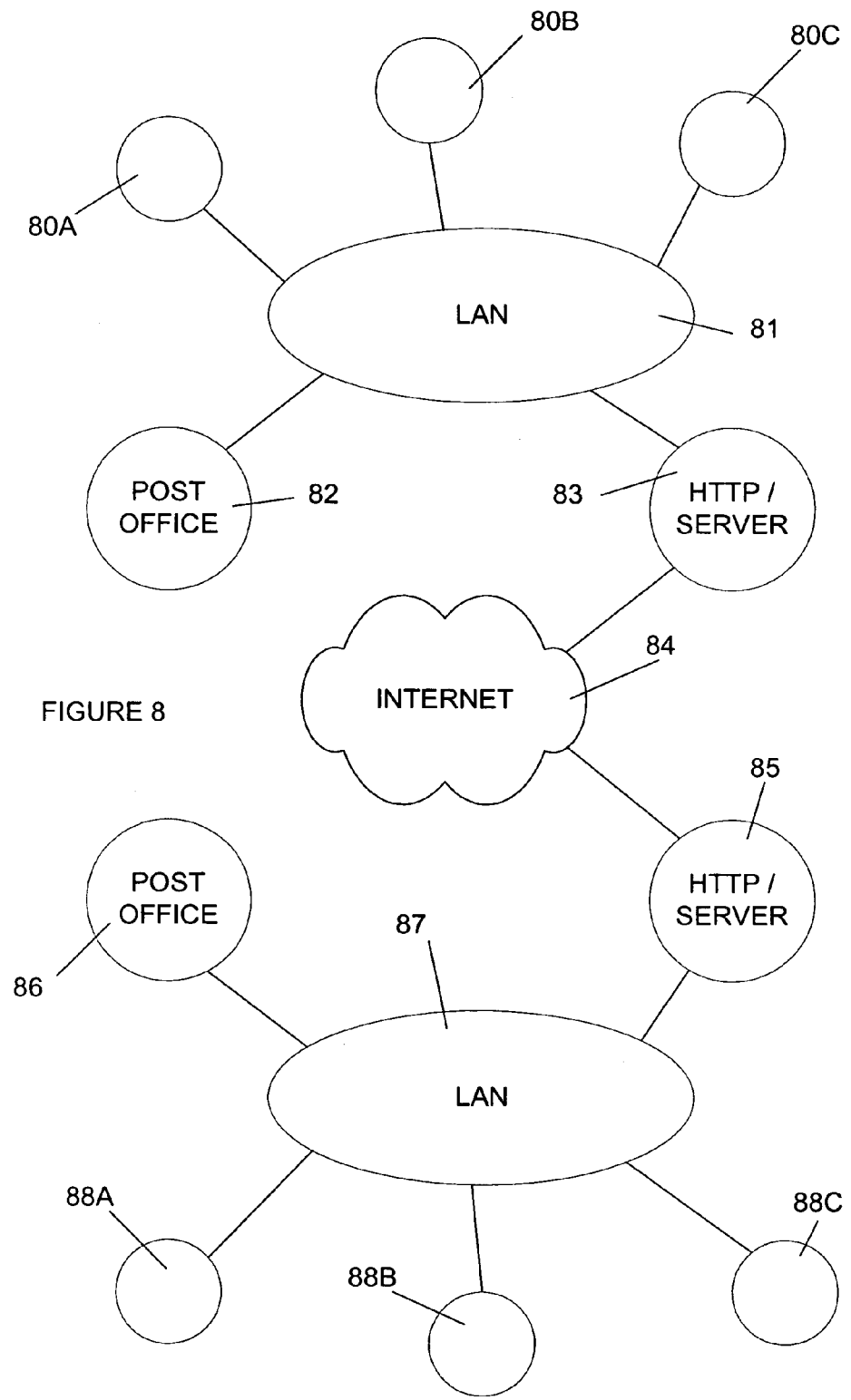
FIG. 8 is a schematic diagram of two LAN computer networks connected via the internet according to an exemplary embodiment of the present invention.

The operation of an e-mail communications system incorporating an attachment delayed-delivery module is explained with reference to FIG. 8, in which an e-mail communication with an attachment is transmitted from computer 80*a* to computer 88*c* via the Internet 84. Computers 80*a*, 80*b*, and 80*c* are connected together via LAN 81. Post office server 82 connects to LAN 81 for transmitting e-mail both within and outside the LAN network. A world wide web hyper text transport protocol (HTTP) server 83 (web server), or internet gateway, is also connected to the LAN 81 for facilitating communication between any of the computers 80*a*, 80*b*, and 80*c* with other computer systems via the internet 84. Likewise, computers 88*a*, 88*b*, and 88*c* are connected together through LAN 87, which is also connected to a post office server 86 and web server 85.

When a user stationed at computer 80*a* sends an e-mail communication having a message and one or more attachment files, an e-mail application program running on computer 80*a* performs initial formatting and then forwards the communication to the LAN 81 for transmission. This e-mail communication does not include any viewer applets, but may include an indicator that one or more viewer applets are available for transmission. The LAN receives the communication and forwards it to post office server 82. Post office server 82 first determines whether the e-mail is a local communication within the LAN network. When the e-mail is not a local communication, the e-mail communication is forwarded at the internet gateway 83 and reformatted according to a MIME or UUENCODE format for transmission along the internet.

The e-mail is then received at the destination internet gateway 85, reformatted, and forwarded to destination post office 86. A notification message is generated at the post office and transmitted along LAN 87 to destination computer 88*c*. When a user at the destination computer 88*c* elects to read the e-mail communication, the LAN 87 then forwards the e-mail communication directly to the destination computer. This e-mail communication includes at least one icon for the recipient to select to transmit viewer applets for viewing the one or more e-mail attachments.

The e-mail communications system at computer 80*a* then transmits one or more viewer applets corresponding to the respective one or more attachment files in the transmitted e-mail communication. The applets are transmitted along the LAN 81 to post office server 82. The applets are detected by a delayed delivery detector (not shown) and are temporarily stored at the post office server 82. After delivery of the e-mail communication, if a recipient selects an icon to request the one or more applets, a signal is transmitted by the recipient's e-mail communication system for detection by the delayed delivery detector. The post office server 82 then downloads the request viewer applets for transmission to the recipient. The viewer applet is then deleted from the post office.

In a second mode of operation, the e-mail that is transmitted to the recipient includes a "viewer applet icon." If the recipient of the e-mail communication is unable to view an attachment, the recipient can select the icon. This sends a return e-mail to the sender's address. The return e-mail has a code in the subject heading portion that prompts the sender's e-mail post office. Accordingly, the sender's e-mail post office intercepts this e-mail and then sends the viewer applet as an attachment to an e-mail communication to the requesting recipient.

Figure 9:
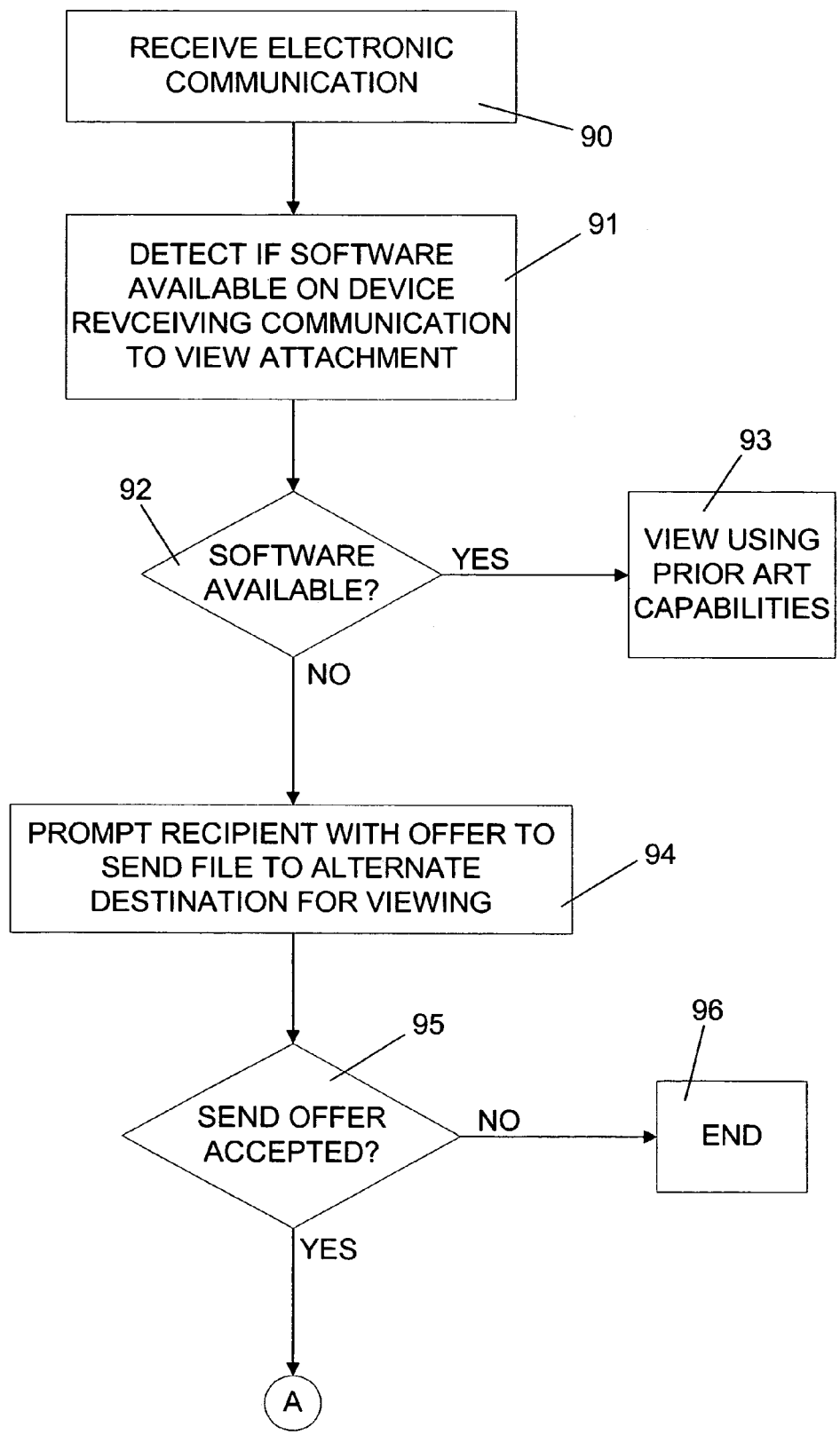
FIGS. 9-11 depict a flow diagram for viewing an attachment to an electronic communication transmitted in an electronic messaging system, according to an exemplary embodiment of the present invention.
Figure 10:
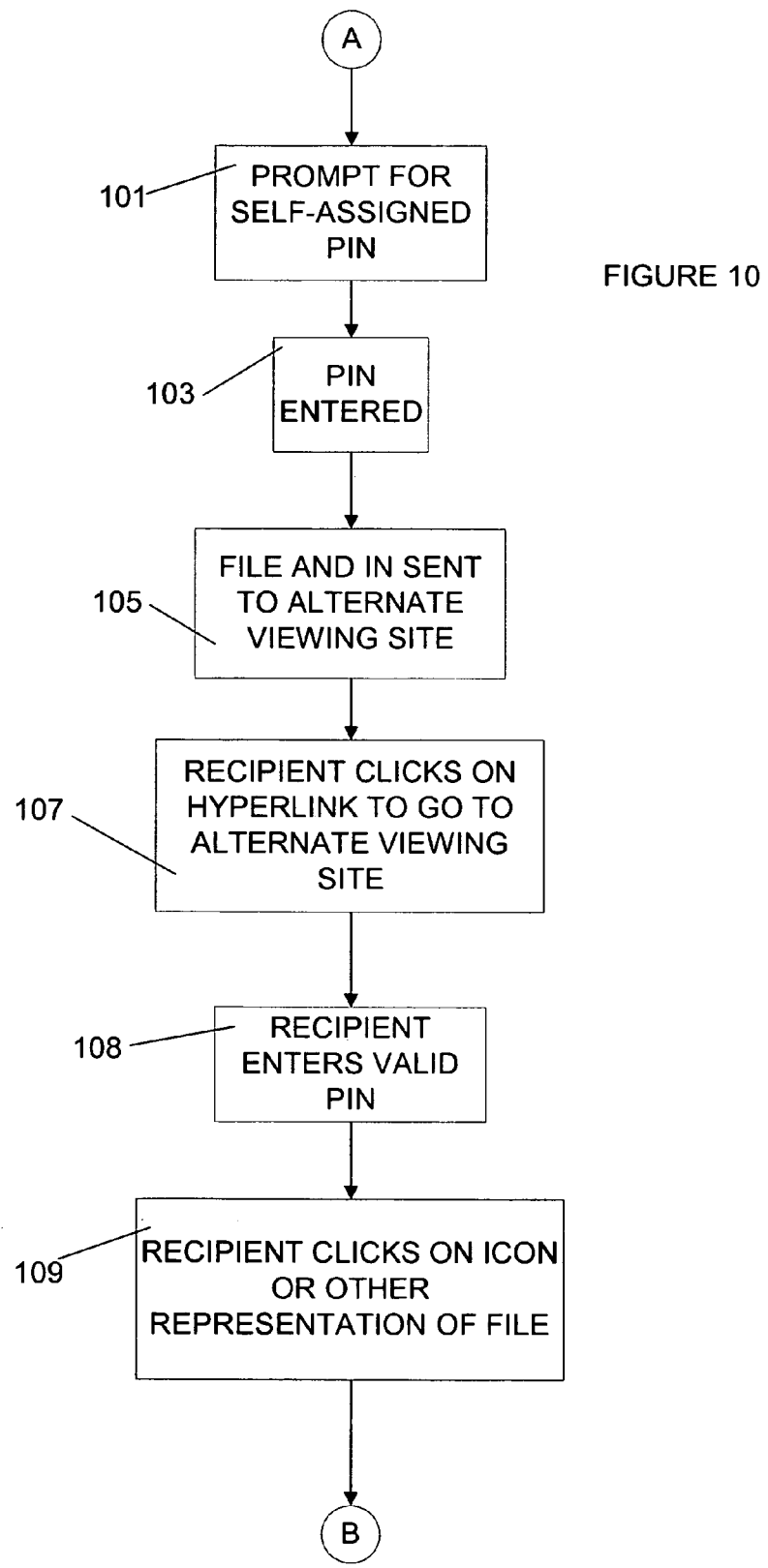
Figure 11:
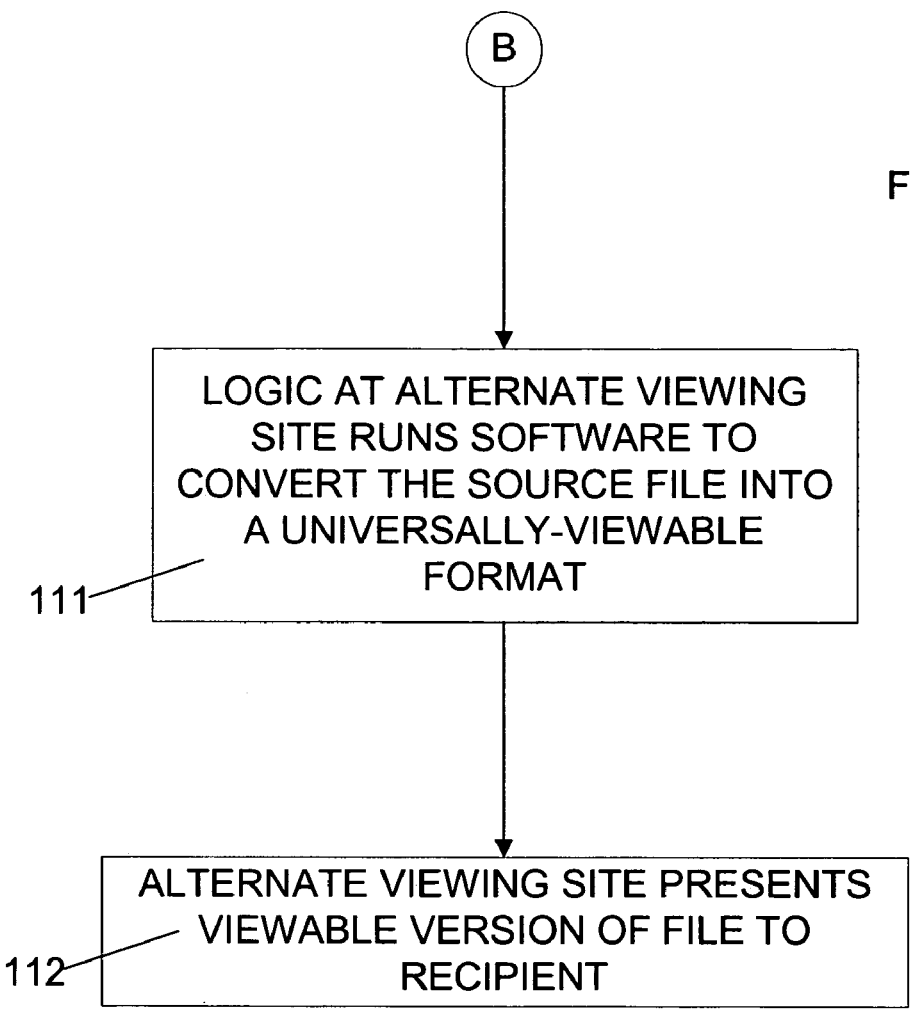

FIGS. 9-11 provide flow diagrams for an exemplary embodiment of a process for viewing an attachment to an electronic communication transmitted in an electronic messaging system. In this embodiment, an attachment to a message that cannot be viewed, due to a lack of a suitable viewing software application, is sent to an alternate viewing site where the attachment is converted to a universally-viewable format. The alternate viewing site may exist in a communication device among other devices. The communication device may be a wireless device such as a cell phone, a pager, a laptop, or some other wireless device, or a wireline device such as a computer, or some other device connected to a network by wire or cable.

In FIG. 9, at step 90, a user receives an electronic communication, which could be an email message, an instant message, or some other communication. A file may be attached as part of the communication which the sender intends the receiver to view. At step 91, the content of the communication is examined to determine, at step 92, whether the receiver of the communication has software that can be used to view the attachment.

If the software is available, step 93 provides that the receiver views the attachment using methods known to those skilled in the art. If the software is not available, at step 94, the recipient is prompted with an offer to send the attached file to an alternate destination for viewing. If the offer is not accepted, the process ends at step 96.

If the offer is accepted, then, at step 101 in FIG. 10, the receiver is prompted to enter a personal identification number (PIN), or other security code. The PIN is entered by the receiver at step 103, and at step 105, the attachment file with the associated PIN is sent to an alternate viewing site. The location of the viewing site may be presented to the receiver at this time. It may be a URL for a website, a server location, or some other location as known to someone skilled in the art. At step 107, the receiver visits the alternate viewing site. He or she may click on a hyperlink to a URL, enter a URL into a browser, or use some other means to visit the alternate site. The alternate site may be a secure website that may require the entry of a security code. At step 108, the receiver is prompted to enter the PIN that he or she originally entered in step 103. In step 109, the receiver clicks on an icon or some other representation of the attachment file to be viewed.

Then, at step 111, shown in FIG. 11, logic at the alternate viewing site runs software to convert the attachment file into a universally-viewable format. The format could be .pdf, HTML, or some other format for which a viewer is universally available. At step 112, the alternate viewing site presents the universally-viewable version of the file to the receiver.

Figure 12:
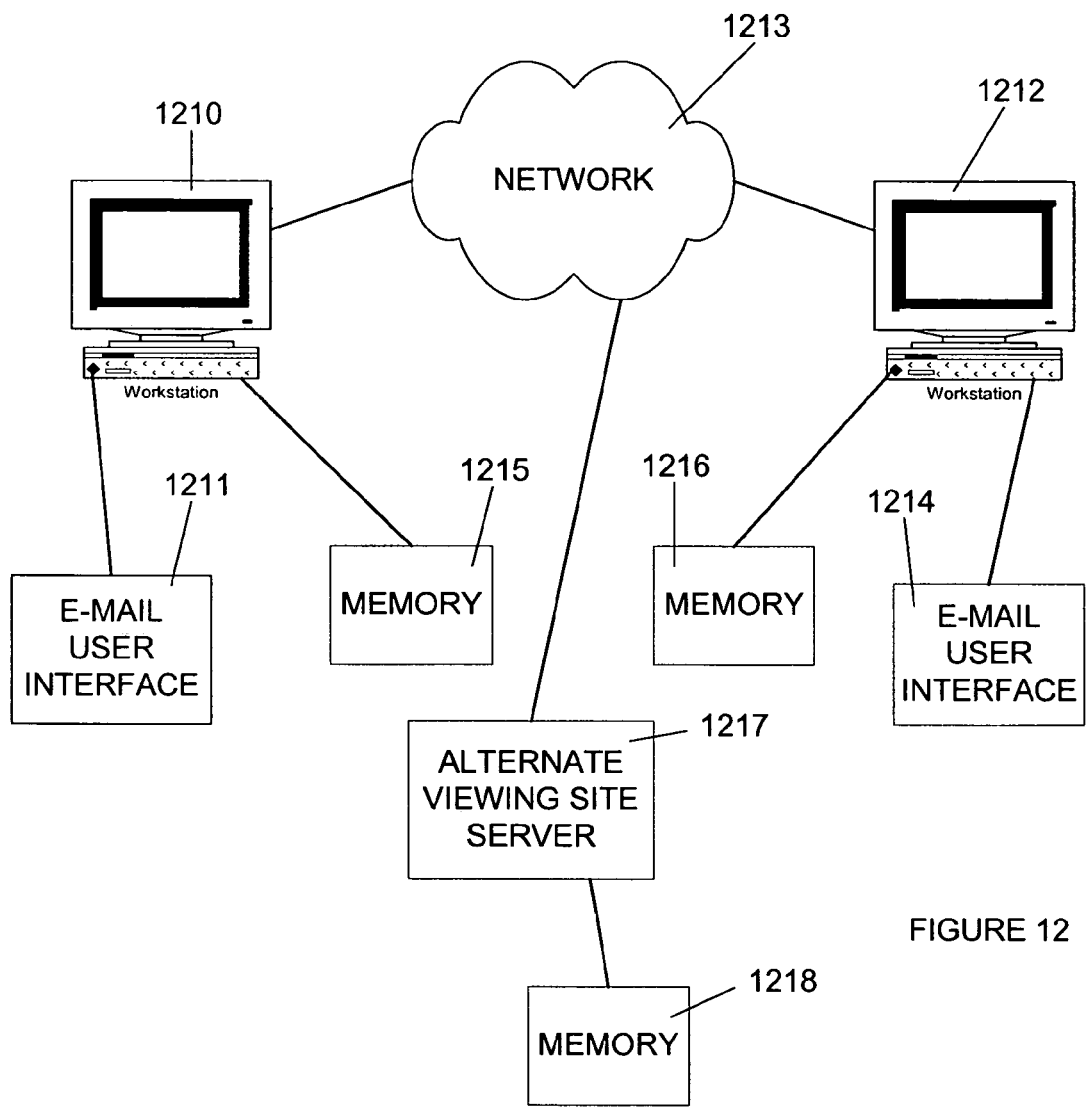
FIG. 12 is a schematic diagram of a basic computer network and alternate viewing site system according to an exemplary embodiment of the present invention.

FIG. 12 is a schematic diagram of a basic computer network system, in which computer 1210 is connected to computer 1212 through a network 1213 to facilitate e-mail communications with attachments. Computer. 1210 has an e-mail communications user interface 1211 that permits the computer to send e-mail communications using network 1213. Likewise, computer 1212 has an e-mail communications user interface 1214 that permits the computer to receive e-mail communications from network 1213. The term computer in this description is not limited to any particular type of computer, and may include computer systems having many computers, or only a portion of a computer. Network 1213 can be in the form of a wired network or a wireless network. The network may be a simple, single communication path, or it may include one or several LANs or WANs, the World Wide Web, or any combination thereof. Computers 1210 and 1212 may be the only computers connected to the network 1213, or the network may be shared by many other computers. Computers 1210 and 1212 additionally include memories 1215 and 1216, respectively, for storing a plurality of user applications, which may or may not include software packages for word processing, CAD, mathematical equation editing, video editing, graphics, multimedia presentations, etc.

Alternative viewing site server 1217 is connected through network 1213 to facilitate the viewing of the attachment file. Server 1217 may be connected to network 1213 in the form of a wired or a wireless connection. Server 1217 includes a memory device 1218 for storing the attachment file and at least the application for converting the attachment file to a universally-viewable format. Memory device 1218 may be RAM, a hard drive, or one or more of many other memory devices known to one skilled in the art.

As can be readily seen, the e-mail communications system viewer module and delayed-delivery module provide several advantages to the sender and receiver for transmitting and reviewing e-mail communications. The system allows for the most efficient use of the network by sending a viewer applet only when it is probable that the recipient would otherwise be unable to review an attachment. The viewer module can be configured in any of several possible modes of operation to balance network efficiency with the criticality of sending a viewer applet. With the delayed-delivery module, the e-mail communications system sends the viewer applet only when requested by the recipient, thereby saving network resources.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for viewing an attachment to an electronic communication transmitted in an electronic messaging system, comprising:
   receiving a communication with an attachment at a device of an addressee of the communication;
   examining content of the communication;
   sending the attachment from the device to an alternate viewing site external to the receiving device for presenting the attachment at the alternate viewing site, the sending resulting from a determination that the attachment is not viewable using software resident on the receiving device.

2. The method according to claim 1, wherein examining the content of the communication comprises examining a file type of an attachment within the communication to make a determination as to whether the attachment is viewable using software resident on a device where the communication is received.

3. The method according to claim 1, wherein sending an attachment contained in the communication to an alternate viewing site is responsive to a prompt to a recipient of the communication.

4. The method according to claim 1, wherein sending an attachment contained in the communication to an alternate viewing site includes prompting the recipient of the communication to enter a security code.

5. The method according to claim 1, wherein sending an attachment contained in the communication to an alternate viewing site includes sending a security code entered by the recipient.

6. The method according to claim 5, wherein viewing the content of the attachment contained in the communication at the alternate viewing site comprises viewing a secure website using the security code.

7. The method according to claim 1, wherein the content of the attachment presented at the alternate viewing site is converted into a commonly-viewable format.

8. A machine-readable medium, having stored thereon data and instructions, which, when executed:
   receive a communication with an attachment at a device of an addressee of the communication;
   examine content of the communication; and
   send the attachment from the device to an alternate viewing site external to the device the sending a result of a determination that the attachment is not viewable on the device.

9. The machine-readable medium according to claim 8, wherein examining content of the communication comprises examining a file type of an attachment within the communication to make a determination as to whether the attachment is viewable using software resident on a device where the communication is received.

10. The machine-readable medium according to claim 8, wherein sending an attachment contained in the communication to an alternate viewing site is responsive to a prompt to a recipient of the communication.

11. The machine-readable medium according to claim 8, wherein sending an attachment contained in the communication to an alternate viewing site includes prompting the recipient to enter a security code.

12. The machine-readable medium according to claim 11, wherein sending an attachment contained in the communication to an alternate viewing site includes sending the security code entered by the recipient.

13. The machine-readable medium according to claim 12, wherein viewing the content of the attachment contained in the communication at the alternate viewing site comprises viewing a secure website using the security code.

14. The machine-readable medium according to claim 8, wherein the alternate viewing site converts the attachment into a commonly-viewable format.

15. The machine-readable medium according to claim 8, wherein the communication is an email.

16. The machine-readable medium according to claim 8, wherein the communication is an instant message.

17. A system for viewing an attachment to an electronic communication transmitted in an electronic messaging system, comprising:
   a communication device of an addressee of an electronic communication with an attachment, the device in communication with a communication network; and
   an electronic messaging application for sending and receiving electronic communications over the communication network;
   wherein the attachment is sent by the communication device to an alternate viewing site external to the communication devices for presentation at the alternate viewing site, wherein the attachment is sent as a result of a determination that the attachment is not viewable using software resident on the communication device.

18. The system of claim 17, wherein the communication device is a wireless device.

19. The system of claim 17, wherein the communication device is a wireline device.

20. The system of claim 17, wherein the alternate viewing site exists in a communication device.

* * * * *